United States Patent [19]

Skowronski et al.

[11] Patent Number: 5,059,132

[45] Date of Patent: Oct. 22, 1991

[54] ELECTRICAL RACEWAY WITH IMPROVED GROUND CONNECTION METHOD AND APPARATUS

[75] Inventors: David M. Skowronski; Robert W. DeRoss, both of Naperville; Steven Bogiel, Schaumburg; Joseph Gierut, Tinley Park; Mark M. Data, Bollingbrook; Dennis Stanhibel, Justice; Ronald Dudek, Orland Park, all of Ill.

[73] Assignee: Molex Incorporated, Lisle, Ill.

[21] Appl. No.: 563,723

[22] Filed: Aug. 6, 1990

Related U.S. Application Data

[63] Continuation of Ser. No. 478,891, Feb. 12, 1990, abandoned.

[51] Int. Cl.$^5$ .............................................. H01R 4/66
[52] U.S. Cl. .................................... 439/100; 439/215; 174/48
[58] Field of Search ............. 439/92, 95, 96, 207–209, 439/211, 214–216, 100, 210, 212, 213; 174/48, 51

[56] References Cited

U.S. PATENT DOCUMENTS

| | | | |
|---|---|---|---|
| 2,626,973 | 1/1953 | Dutra | 439/95 |
| 4,367,370 | 1/1983 | Wilson et al. | 439/215 |
| 4,429,934 | 2/1984 | Vanden Hoek et al. | 439/207 |
| 4,577,055 | 3/1986 | Wuertz | 174/48 |
| 4,749,368 | 6/1988 | Mouissie | 439/421 |
| 4,772,228 | 9/1988 | Seymour | 439/865 |
| 4,973,796 | 11/1990 | Dougherty et al. | 439/215 |

FOREIGN PATENT DOCUMENTS

| | | | |
|---|---|---|---|
| 2100531 | 8/1971 | Fed. Rep. of Germany | 439/207 |
| 972931 | 10/1964 | United Kingdom | 174/51 |
| 2144928 | 3/1985 | United Kingdom | 439/96 |

Primary Examiner—Gary F. Paumen
Attorney, Agent, or Firm—Louis A. Hecht; Stephen Z. Weiss; Charles S. Cohen

[57] ABSTRACT

This specification discloses an electrically conductive raceway as used in an prefabricated interior wall panel system with a means for electrically connecting a ground wire directly to a portion of the raceway without the need for separate clips or terminals and the method and apparatus for making same.

5 Claims, 4 Drawing Sheets

ELECTRICAL RACEWAY WITH IMPROVED GROUND CONNECTION METHOD AND APPARATUS

This is a continuation of co-pending U.S. Pat. application Ser. No. 478,891, filed on Feb. 12, 1990, now abandoned.

BACKGROUND OF THE INVENTION

1. Field of The Invention

This invention relates to a method and apparatus of grounding a cable in an electrical conductive raceway and the raceway for use in an interior wall system by forming a crimp section in the wall of the raceway, and then crimping a bare, or partially bare, cable or wire directly to the wall With the crimp section.

2. Description of Related Art

U.S. Pat. No. 4,367,370 discloses an interior wall system used for dividing offices and other interior regions into smaller work areas. These prior art systems include a plurality of prefabricated panels releasably joined together and individually electrically prewired to facilitate supplying electrical energy to areas bounded by the wall system.

One necessary aspect of the wall panel is the grounding system for the metal parts. For reasons of safety and prevention of electrical short circuits, a raceway encloses the power cable. When the raceway is made of metal, it must be grounded. U.S. Pat. No. 4,429,934 discloses one method of providing a ground using a ground clip. This prior art clip is clipped to the ground wire of the cable and is hooked over the edge of the wall of the raceway making electrical contact thereto. This grounds not only the raceway but also the panel sections in electrical contact with the raceway. U.S. Pat. No. 4,577,055 discloses a method of attaching a ground wire to a metal frame by using a screw and washer or a screw and ring terminal.

Although the prior methods of attaching the metal raceway to the ground have worked well, an attempt has been made to make the connection less costly from both a material and a labor standpoint. To take advantage of the labor savings provided by machinery production of this ground connection, a metal rivet has been used to attach an insulation displacement terminal or a ring terminal to the metal base. With one additional step, the ground is attached to either of these terminals. In both of these methods of ground connection, although time is saved, an extra terminal is needed to connect the wire to the metal base. This use of additional terminals adds to cost and creates the potential for inventory control problems.

SUMMARY OF THE INVENTION

In the present invention a prewired electrical subassembly is disclosed having a ground wire connected to an elongated metal raceway by crimping means stamped and/or formed unitarily with the raceway. The invention also is directed to a method of making this novel subassembly. The method includes the steps of: forming a unitary metal raceway with a ground contact means therein; locating a ground wire within the portion of the raceway having the ground contact means; moving at least portions of the raceway and/or the ground wire for forming a permanent electrical connection between the ground wire and the raceway.

The invention further is directed to an apparatus fo carrying out the above described method.

These, and other objects and advantages of the inver tion, will be more fully understood and appreciated b reference to the accompanying drawings and writte description of the preferred embodiment.

DETAILED DESCRIPTION OF THE PREFERRED EMBODIMENT

Figure 1:
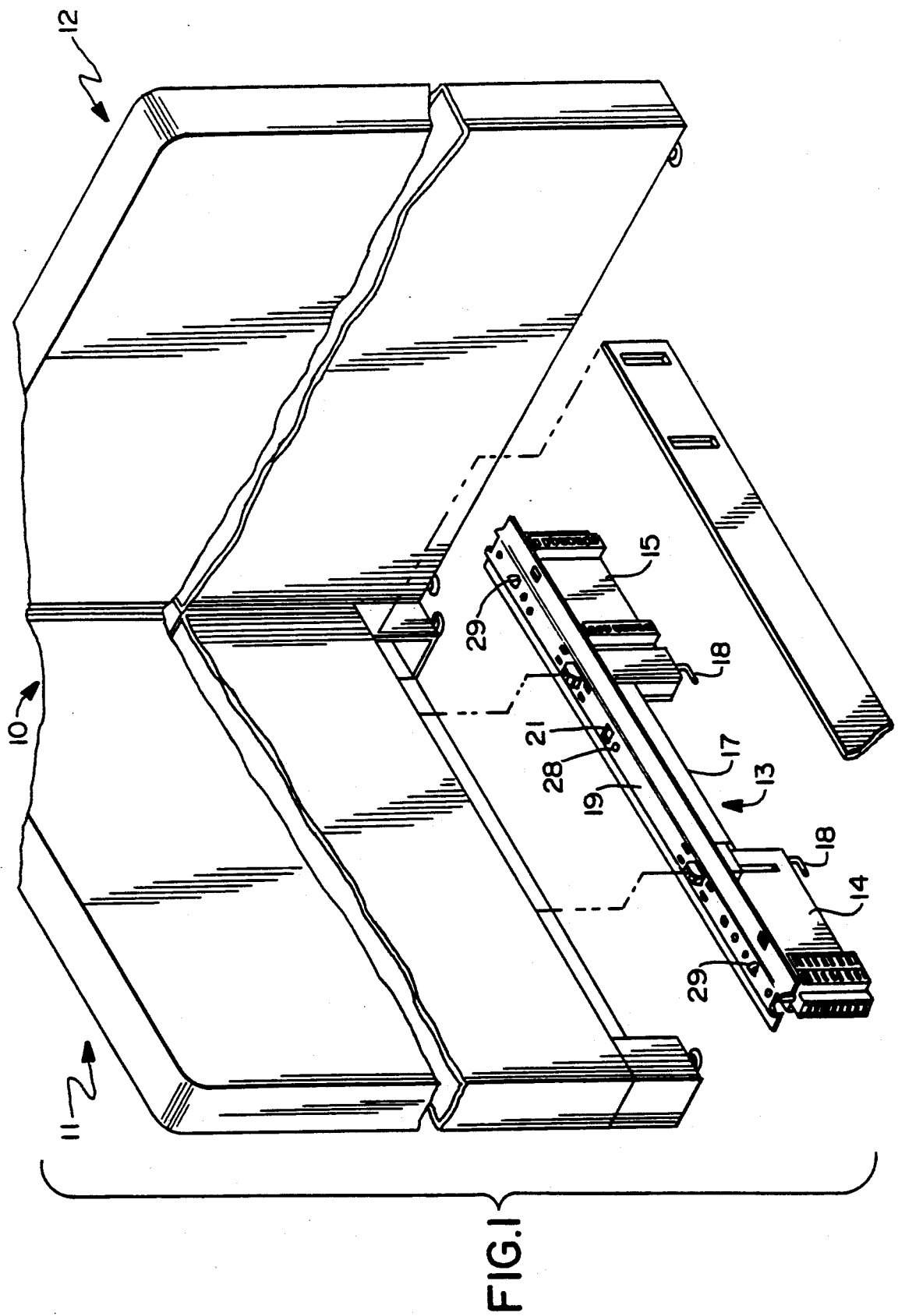
FIG. 1 is a perspective view of the wall panel illus trating the location of the raceway in the panel.

FIG. 1 illustrates a wall system 10 formed by a serie of interconnected upright prefabricated wall panels only two substantially identical panels 11 and 12 being illustrated. Panels of different lengths can be intercon nected.

Each panel, such as panels 11 and 12, include a1 internal rigid, rectangular frame formed by parallel to] and bottom rails rigidly joined together by parallel sid. rails. These rails are of channel shaped configuratioi and open inwardly of the panel, whereby the fram. confines a suitable core structure, normally a honey comb layer or similar conventional structure. The cor. and frame are normally sandwiched between thin facin; sheets disposed on opposite sides of the frame. Thes. sheets are normally covered by a suitable fabric whicl define the exterior side faces of the panel.

The panels 11 and 12 are provided with a prewirec electrical assembly 13 extending longitudinally alon; the lower edge thereof. This system includes identica power blocks 14 and 15 disposed adjacent the opposit. lower corners of the panel. The power blocks 14 and 1! are individually electrically connected by a multicon ductor cable 16 or separate wire conductors. One of th. conductors defines a ground 33. The cable 16 and th. ground 33 extend between the power blocks 14 and 1! through an elongated, closed channel 17. This latte channel 17 extends between and ridgedly joins the hous ings of the power blocks 14 and 15 together. The chan nel 17 is in turn fixedly, but releasably, connected to th. bottom rail of the frame by means of locking handles 18 Locator arms 29 locate the assembly 13 in lateral an. longitudinal relationship with the bottom of panels 1 and 12.

The closed channel 17 is formed by an elongate. open topped raceway 19 and a cover 20 which is en gageable with the raceway 19. The closed channel 17 i dimensioned to permit the cable 16 and ground 33 t. pass therethrough. More particularly, the raceway 1! includes a generally planar longitudinally extendin; bottom wall 22, and flanges 23 and 24 which exten. outwardly from portions of the bottom wall 22. Th. flanges 24 and 23 define portions of the raceway 19 t. which the cover 20 is attached. The raceway 19 i stamped and formed to define a wire crimping portion 21, numerous holes including pilot hole 28, locator arms 29, and spacers 27. As shown most clearly in FIGS. 2 and 3, the wire crimping portion 21 is stamped and formed as one piece with raceway 19 to define a pair of crimping arms 30 which extend generally perpendicularly from the plane of the bottom wall 21 of the raceway 19.

Figure 3B:
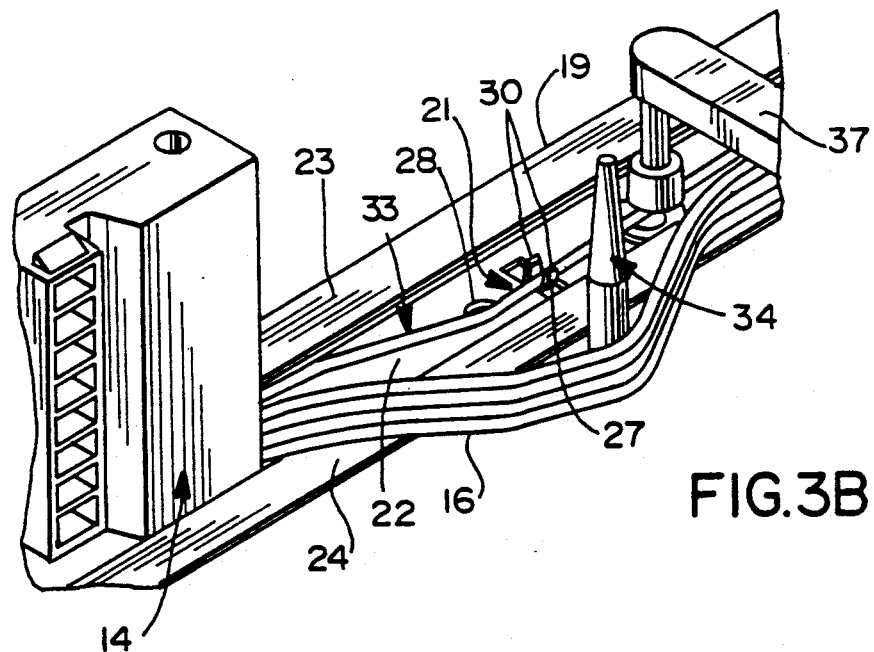
FIG. 3B is a perspectiv. view of the raceway in FIG. 1 after the raceway i rotated into a vertical position shown in FIG. 2.
Figure 3A:
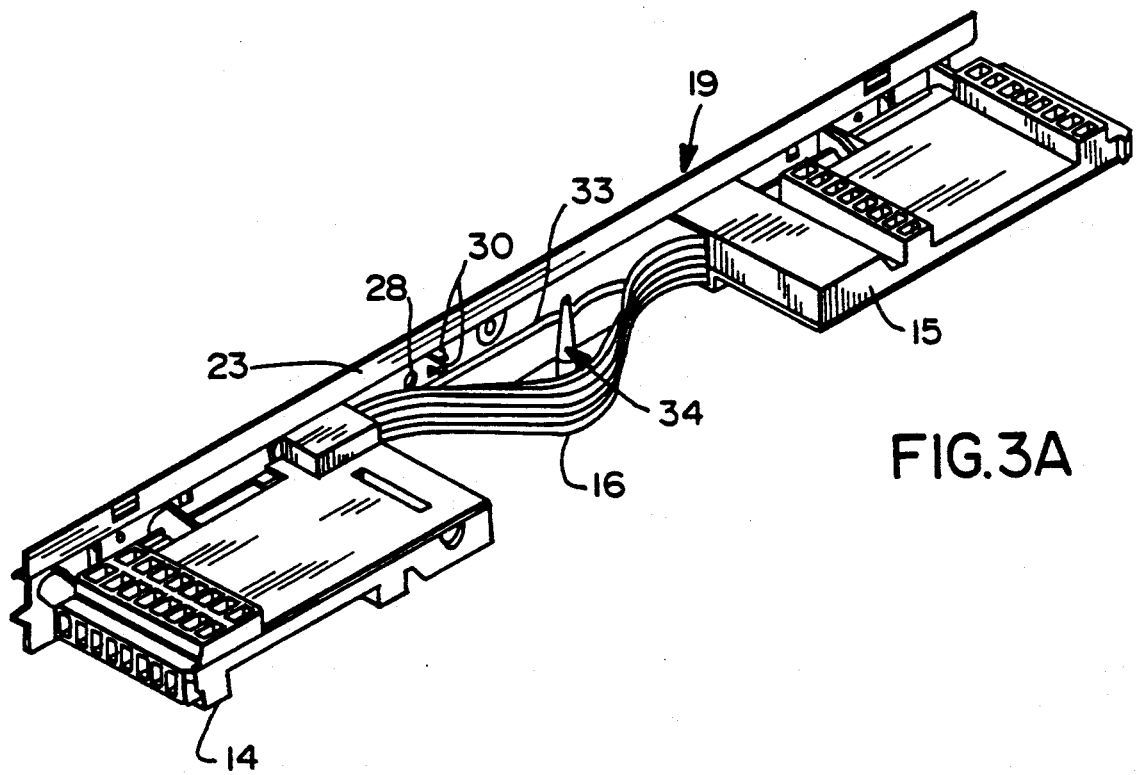
FIG. 3A is a perspective view of the raceway in FIG 1 before the arms of the crimp are forced down upo: the ground conductor wire.
Figure 4:
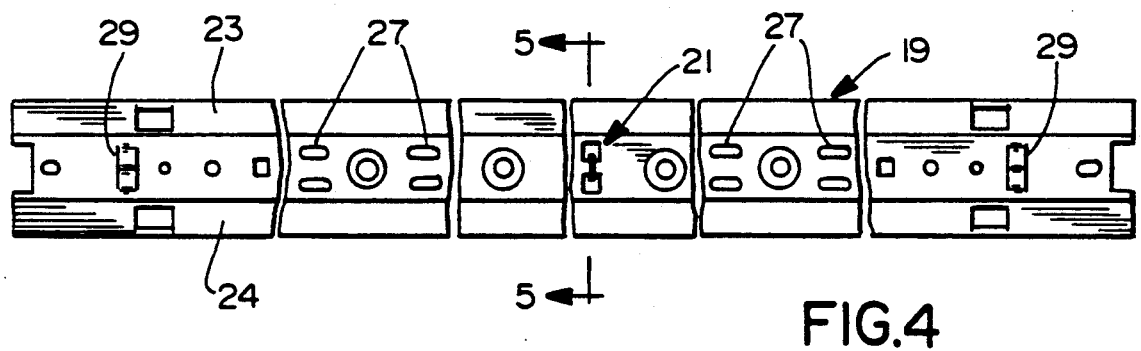
FIG. 4 is a top view of the raceway.
Figure 5:
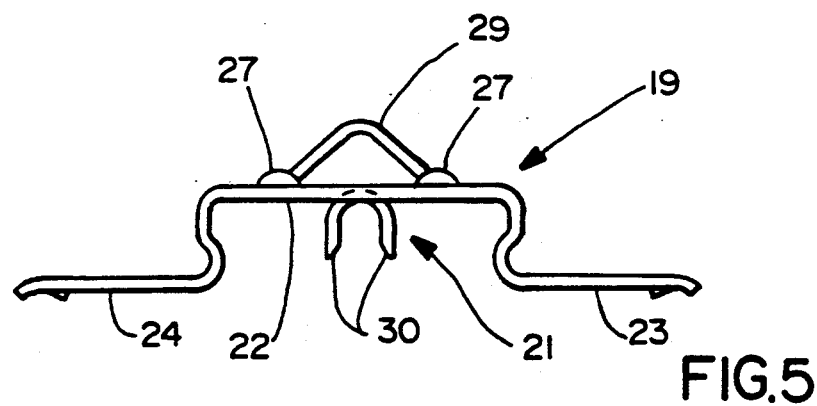
FIG. 5 is a cross sectional view of the crimp sectio: taken along lines 55 of FIG. 4.
Figure 6:
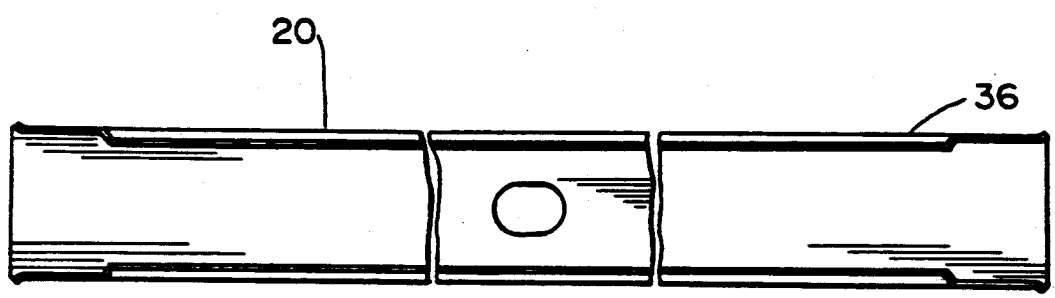
FIG. 6 is a top view of the raceway mounting cap.

The raceway 19 with the power blocks 14 and 15 placed on spacers 27, cable 16 and ground 33 are initially positioned as illustrated in FIG. 3A in a fixture apparatus 40 (not shown completely in FIGS. 3A and 3B), which is mounted in proximity to a crimp press 35. The fixture apparatus 40 includes a sliding raceway mount 31 having a locating channel 36 for receiving the raceway 19 therein. The sliding raceway mount 31 is slidably movable along parallel rods 38 and 39 for slidable movement toward and aWay from the crimp press 35. The sliding raceway mount 31 of the fixture apparatus 40 further includes a fixed wire guide 34 extending generally perpendicularly therefrom at a location slightly spaced from the channel 36 for holding the cable 16 aWay from the raceway 19. Referring to FIGS. 3A and 3B, the assembly of the raceway 19, power blocks 14, 15, cable 16 and ground 33 is positioned such that the raceway 19 and the ground 33 are disposed between the fixed wire guide 34 and the locating channel 36 in the fixture apparatus 40. The cable 16 without ground 33 is disposed on the side of the fixed wire guide 34 opposite the locating channel 36. The raceway 19 and power blocks 14, 15 are then rotated approximately 90 degrees about the longitudinal axis of the raceway 19 such that the raceway 19 becomes positioned in the locating channel 36 of the fixture apparatus 40. However, as shown in FIG. 3B, the cable 16 will remain spaced from the ground wire 33 by the fixed wire guide 34.

Again referring to FIGS. 3A and 3B, it will be appreciated that proper lateral and longitudinal alignment of the raceway 19 in the fixture apparatus 40 is important for achieving proper crimping of the arms 30 of the crimping portion 21 to the ground 33. This proper alignment and positioning is achieved by a pilot locator stud 42 (not shown) which extends from the locating channel 36 of the fixture apparatus 40 for engagement with the pilot hole 28 in the bottom wall 22 of the raceway 19.

Figure 2:
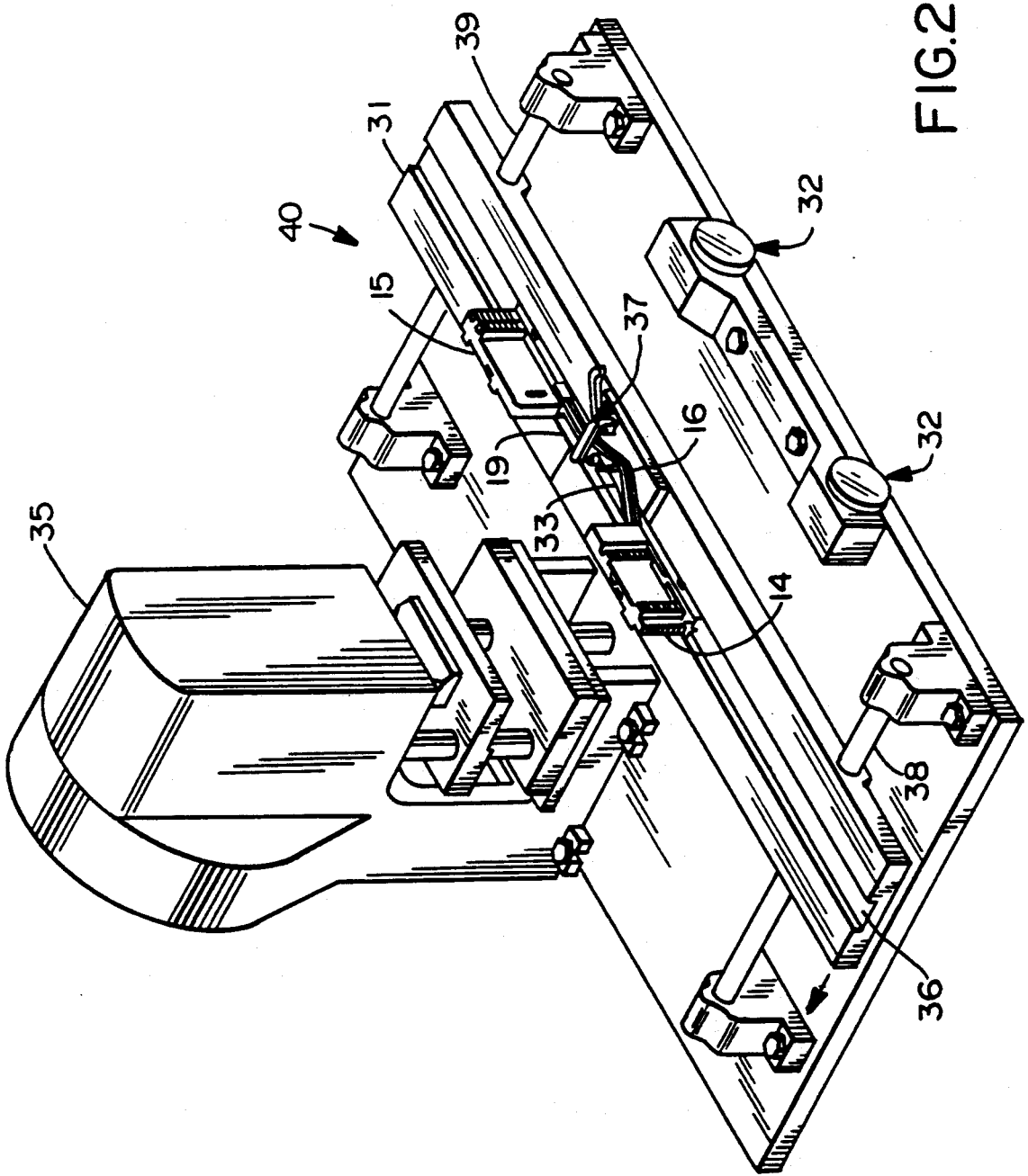
FIG. 2 is a perspective view of the preferred embodi ment of the raceway in the holding fixture before th bared ground wire is crimped.

The fixture apparatus 40 further includes a wire clamp 37 mounted thereto in proximity to the pilot locator stud 42 (not shown) which engages the pilot hole 28 and the fixed wire guide 34, as shown most clearly in FIG. 2. The clamp 37 is operative to securely engage and retain the ground 33 in a position intermediate the arms 30 Of the crimping portion 21. As illustrated in FIG. 2, the clamp 37 is manually engageable and releasable. However, it is to be understood that more automated clamping means may be provided.

The clamp 37 is activated to securely retain the ground 33 between the crimp arms 30.

After actuation of the clamp 37, the operator of the apparatus initiates a cycle by depressing the activation buttons 32. This activation generates a slidable advancement of the fixturing apparatus 40 along the rods 38 and 39 and toward the crimp press 35. The proper positioning of the fixturing apparatus 40 relative to the crimp press 35 is sensed by appropriate electro-mechanical or optical sensing means incorporated into the crimp press 35. Upon this proper alignment of the fixturing apparatus 40 in the crimp press 35, a crimping cycle is commenced to urge the arms 30 of the crimping portion 21 downwardly toward the bottom wall 22 of the raceway 19 and into secure crimping engagement with the ground 33. Upon completion of this crimping cycle, the fixturing apparatus 40 is moved away from the crimp press 35 and the rods 38 and 39 into a position where the operator of the apparatus can release the clamp 37 and urge the cable 16 into the raceway 19. The cover 20 is then fastened to the raceway 19 to complete the pre-wired electric subassembly 13. The subassembly 13 is then removed from the fixturing apparatus 33 to enable positioning of another raceway subassembly therein.

Although a particular preferred embodiment of the invention has been disclosed in detail for illustration purposes, it will be recognized that variations or modifications of the disclosed apparatus including the rearrangement of parts are within the scope of the present invention.

What is claimed is:

1. In a space dividing wall structure formed from a plurality of prefabricated upright panels which are serially connected together said wall structure including a prewired electrical subassembly comprising an elongated metal raceway having opposed longitudinal ends, a bottom wall extending between the opposed longitudinal ends and pair of generally opposed side walls connected to said bottom wall and extending between the opposed ends, said subassembly further comprising at least one power block fastened to said raceway, a plurality of electrical conductors extending from the power block to the longitudinal ends of said elongated metal raceway, including at least one continuous ground conductor, said conductors being disposed intermediate the side walls of the raceway, and a cover mounted to the side walls for substantially enclosing the conductors in the raceway, wherein the improvement comprises electrical terminating means formed as one piece with said metal raceway for electrically connecting the continuous ground conductor to the raceway where said electrical terminating means includes crimping means comprising two cantilevered arms having chamfered tips generally perpendicular to the metal raceway and directly opposite one another defining a space into which said continuous ground conductor can be placed before being crimped.

2. A wall structure of claim 1 wherein said metal raceway includes locating means formed unitarily with said metal raceway to locate the raceway in longitudinal relationship with said wall structure, said locating means extending out from a surface of said metal raceway opposite a surface forming an inner portion of the raceway substantially enclosing the conductors in the raceway.

3. A wall structure of claim 2 wherein said metal raceway has a channel section formed in its longitudinal axis for locating and holding said power block where said power block is affixed perpendicularly to the base of said channel.

4. A wall structure of claim 2 wherein said locating means forms an inverted "V" shape in cross section, perpendicular to the longitudinal axis of the metal raceway.

5. In a space dividing wall structure formed from a plurality of prefabricated upright panels which are serially connected together said wall structure including a prewired electrical subassembly comprising an elongated metal raceway having opposed longitudinal ends, a bottom wall extending between the opposed longitudinal ends and pair of generally opposed side walls connected to said bottom wall and extending between the opposed ends, said subassembly further comprising two end power blocks fastened to said raceway, generally adjacent the opposed ends thereof, a plurality of electrical conductors extending between the power blocks including at least one continuous ground conductor, said conductors being disposed intermediate the side walls of the raceway, and a cover mounted to the side walls for substantially enclosing the conductors in the raceway, wherein the improvement comprises electrical terminating means formed as one piece with said metal raceway for electrically connecting the ground conductor to the raceway where said electrical terminating means includes crimping means comprising two cantilevered arms having chamfered tips generally perpendicular to the metal raceway and directly opposite one another defining a space into which said continuous ground conductor can be placed before being crimped.

* * * * *